United States Patent
Chen et al.

(10) Patent No.: US 8,769,140 B2
(45) Date of Patent: Jul. 1, 2014

(54) METHOD AND SYSTEM FOR OPTIMIZING POWER CONSUMPTION IN A HOME NETWORK VIA A BROADBAND GATEWAY

(75) Inventors: Xuemin Chen, Rancho Santa Fe, CA (US); Jeyhan Karaoguz, Irvine, CA (US); Wael William Diab, San Francisco, CA (US); David Garrett, Tustin, CA (US); David Albert Lundgren, Mill Valley, CA (US); Rich Prodan, Niwot, CO (US)

(73) Assignee: Broadcom Corporation, Irvine, CA (US)

( * ) Notice: Subject to any disclaimer, the term of this patent is extended or adjusted under 35 U.S.C. 154(b) by 321 days.

(21) Appl. No.: 12/982,433

(22) Filed: Dec. 30, 2010

(65) Prior Publication Data

US 2011/0302309 A1  Dec. 8, 2011

Related U.S. Application Data

(60) Provisional application No. 61/351,696, filed on Jun. 4, 2010.

(51) Int. Cl.
*G06F 15/16* (2006.01)
*G06F 15/173* (2006.01)

(52) U.S. Cl.
USPC .......................................... 709/231; 709/225

(58) Field of Classification Search
USPC .................................................. 709/225, 231
See application file for complete search history.

(56) References Cited

U.S. PATENT DOCUMENTS

| | | | | |
|---|---|---|---|---|
| 8,005,476 B2* | 8/2011 | Karaoguz et al. | ........... | 455/435.3 |
| 2004/0193648 A1* | 9/2004 | Lai et al. | ..................... | 707/104.1 |
| 2005/0240597 A1* | 10/2005 | Kishi et al. | ....................... | 707/10 |
| 2005/0259668 A1* | 11/2005 | Kim | ............................... | 370/401 |
| 2006/0084461 A1* | 4/2006 | Sekiya et al. | .................. | 455/522 |
| 2006/0133391 A1 | 6/2006 | Kang et al. | | |
| 2008/0242325 A1* | 10/2008 | Bandera et al. | ............... | 455/466 |
| 2010/0115259 A1* | 5/2010 | Elsila et al. | .................... | 713/100 |
| 2011/0055745 A1* | 3/2011 | Penney et al. | .................. | 715/771 |

FOREIGN PATENT DOCUMENTS

WO  0221841 A1  3/2002

OTHER PUBLICATIONS

EP Communication and EP Search Report, EP Application No. 11004118.3, completed Sep. 14, 2011, 3 pages.

* cited by examiner

*Primary Examiner* — Jeong S Park
(74) *Attorney, Agent, or Firm* — Foley & Lardner LLP; Christopher J. McKenna; Paul M. H. Pua (57) ABSTRACT

A broadband gateway, which enables communication with a plurality of devices, handles at least one physical layer connection to at least one corresponding network access service provider. Before allowing the devices to access content from the service provider, the broadband gateway may identify a device power profile for each of the devices, and a network power profile for the content to select a corresponding content delivery mechanism to optimize power consumption. The content may be communicated to the devices utilizing the corresponding selected content delivery mechanism. Depending on configuration, content transcoding may be performed at the broadband gateway and/or at the devices. The content may be burst downloaded and stored in a local storage to be consumed by the devices thereafter. Upon completion of download, the broadband gateway may shut down receiving components to save resources and power. The receiving components may be tuned on to receive additional content when needed.

20 Claims, 5 Drawing Sheets

METHOD AND SYSTEM FOR OPTIMIZING POWER CONSUMPTION IN A HOME NETWORK VIA A BROADBAND GATEWAY

CLAIM OF PRIORITY

This patent application makes reference to, claims priority to and claims benefit from U.S. Provisional Patent Application Ser. No. 61/351,696 filed on Jun. 4, 2010.

The above stated application is hereby incorporated herein by reference in its entirety

INCORPORATION BY REFERENCE

This application also makes reference to:
U.S. patent application Ser. No. 12/355,377 filed on Jan. 16, 2009;
U.S. patent application Ser. No. 12/355,413 filed on Jan. 16, 2009;
U.S. patent application Ser. No. 12/355,480 filed on Jan. 16, 2009;
U.S. patent application Ser. No. 12/395,383 filed on Feb. 27, 2009;
U.S. patent application Ser. No. 12/982,321 filed on Dec. 30, 2010;
U.S. patent application Ser. No. 12/982,355 filed on Dec. 30, 2010;
U.S. patent application Ser. No. 12/981,971 filed on Dec. 30, 2010;
U.S. patent application Ser. No. 12/981,933 filed on Dec. 30, 2010;
U.S. patent application Ser. No. 12/982,216 filed on Dec. 30, 2010;
U.S. patent application Ser. No. 12/982,205 filed on Dec. 30, 2010;
U.S. patent application Ser. No. 12/982,353 filed on Dec. 30, 2010;
U.S. patent application Ser. No. 12/981,966 filed on Dec. 30, 2010;
U.S. patent application Ser. No. 12/982,453 filed on Dec. 30, 2010;
U.S. patent application Ser. No. 12/982,172 filed on Dec. 30, 2010;
U.S. patent application Ser. No. 12/982,429 filed on Dec. 30, 2010;
U.S. patent application Ser. No. 12/981,990 filed on Dec. 30, 2010;
U.S. patent application Ser. No. 12/982,442 filed on Dec. 30, 2010;
U.S. patent application Ser. No. 12/982,000 filed on Dec. 30, 2010;
U.S. patent application Ser. No. 12/982,010 filed on Dec. 30, 2010;
U.S. patent application Ser. No. 12/982,022 filed on Dec. 30, 2010;
U.S. patent application Ser. No. 12/981,986 filed on Dec. 30, 2010;
U.S. patent application Ser. No. 12/982,236 filed on Dec. 30, 2010;
U.S. patent application Ser. No. 12/982,091 filed on Dec. 30, 2010;
U.S. patent application Ser. No. 12/982,213 filed on Dec. 30, 2010;
U.S. patent application Ser. No. 12/982,166 filed on Dec. 30, 2010;
U.S. patent application Ser. No. 12/982,340 filed on Dec. 30, 2010;
U.S. patent application Ser. No. 12/982,073 filed on Dec. 30, 2010;
U.S. patent application Ser. No. 12/982,501 filed on Dec. 30, 2010;
U.S. patent application Ser. No. 12/982,206 filed on Dec. 30, 2010;
U.S. patent application Ser. No. 12/982,440 filed on Dec. 30, 2010;
U.S. patent application Ser. No. 12/982,171 filed on Dec. 30, 2010;
U.S. patent application Ser. No. 12/982,223 filed on Dec. 30, 2010;
U.S. patent application Ser. No. 12/982,305 filed on Dec. 30, 2010;
U.S. patent application Ser. No. 12/982,477 filed on Dec. 30, 2010;
U.S. patent application Ser. No. 12/982,331 filed on Dec. 30, 2010;
U.S. patent application Ser. No. 12/982,036 filed on Dec. 30, 2010;
U.S. patent application Ser. No. 12/982,196 filed on Dec. 30, 2010;
U.S. patent application Ser. No. 12/982,391 filed on Dec. 30, 2010;
U.S. patent application Ser. No. 12/982,405 filed on Dec. 30, 2010;
U.S. patent application Ser. No. 12/981,753 filed on Dec. 30, 2010;
U.S. patent application Ser. No. 12/981,414 filed on Dec. 30, 2010; and
U.S. patent application Ser. No. 12/981,733 filed on Dec. 30, 2010.

Each of the above stated applications is hereby incorporated herein by reference in its entirety.

FIELD OF THE INVENTION

Certain embodiments of the invention relate to broadband gateways. More specifically, certain embodiments of the invention relate to a method and system for optimizing power consumption in a home network via a broadband gateway.

BACKGROUND OF THE INVENTION

With the continuous growth of digital television or broadcast multimedia, and/or broadband access, which may be used in conjunction with online businesses, social networks, and/or other online services and applications, users may desire having access to a larger number of providers and/or a broader range of content in a manner that is flexible and/or suits the users' lifestyles. Most users connect to the Internet using web browsers running on personal computers (PCs). Furthermore, most households may have one or more televisions that may be used to view television and/or multimedia broadcasts. Television broadcasts may include terrestrial TV, Cable-Television (CATV), satellite TV and/or Internet Protocol television (IPTV) based broadcasts. To ensure against unauthorized reception and/or use of TV and/or multimedia broadcast, service providers may require use of dedicated set-top boxes (STBs) that may be used to encrypt broadcast signals communicated from the service providers to generate suitable video and/or audio streams that may be played via televisions and/or other display/playback devices in the household. Furthermore, STBs and/or TVs may support Internet access. Thus, rather than using a computer to access the Internet, a user may find it more convenient to use the flat screen televisions and/or monitors in homes for the same purpose. To do so, for example, an STB connected to a flat screen television may be provided with web browsing software and protocols, and Internet connectivity, which may enable the user to easily access the Internet or check their electronic mail (email), for example, from a convenient and comfortable location such as their living room.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for optimizing power consumption in a home network via a broadband gateway, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for optimizing power consumption in a home network via a broadband gateway. In various embodiments of the invention, a broadband gateway, which enables communication with a plurality of devices, is operable to handle at least one physical layer connection to at least one corresponding network access service provider. In this regard, the at least one physical layer connection may comprise a plurality of physical layer connections and the at least one corresponding network access service provider may comprise a plurality of access service providers. Each of the plurality of physical layer connections corresponds to a respective one of the plurality of corresponding access service providers. Before allowing one or more of the devices to access content from the service provider, the broadband gateway may identify a device power profile for each of one or more of the devices, and a network power profile for the content to select a corresponding content delivery mechanism. The broadband gateway may communicate the content to the one or more of the devices according to the corresponding selected content delivery mechanism. A device power profile may comprise device type, physical connection support and content processing capabilities. A network power profile may comprise content type, content bit rate, content encoding format, and/or corresponding physical connections. Content delivery mechanisms may be selected so as to optimize power consumption in an associated home network. Depending on configuration, content transcoding may be performed at the broadband gateway and/or at the one or more of the devices. The broadband gateway may burst download the content and store it in a local storage to be consumed by the one or more of the devices when needed. Upon completion of download, receiving components such as tuner device that is utilized to receive the content, may be shut down to save resources and power in the home network.

Figure 1:
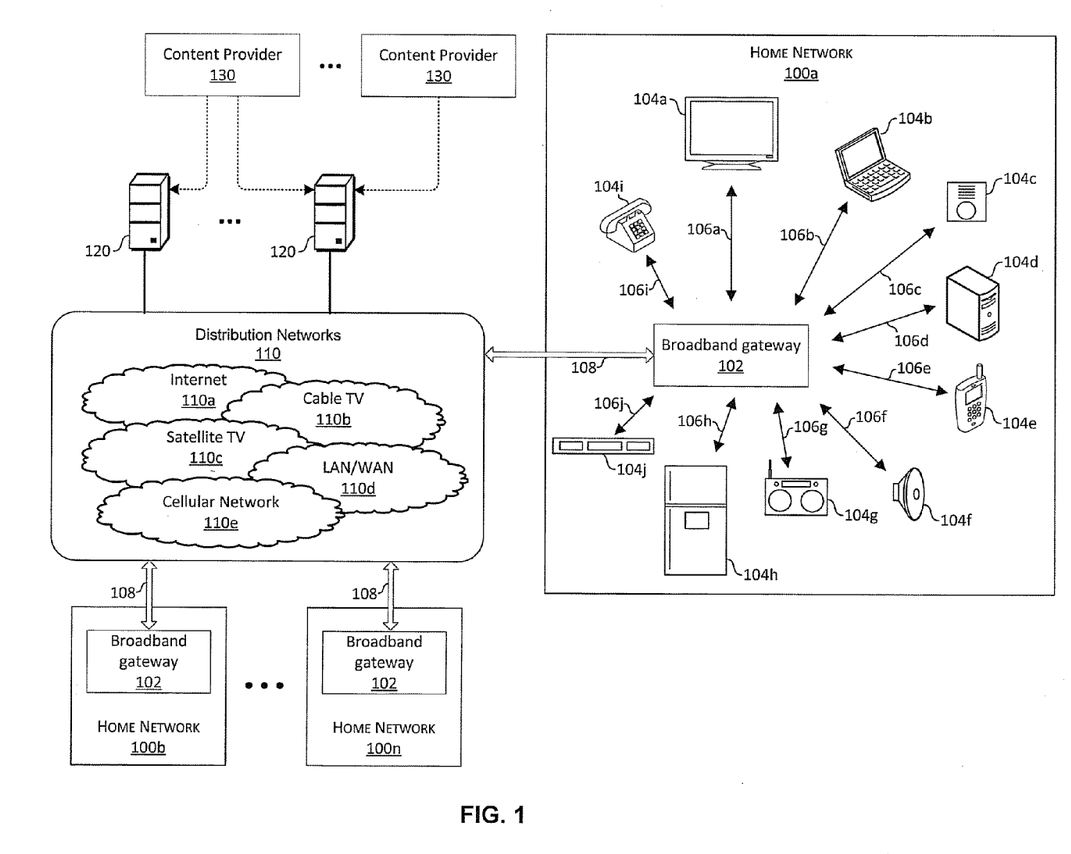
FIG. 1 is a block diagram illustrating an exemplary communication system that comprises a home network serviced by a broadband gateway, in accordance with an embodiment of the invention.

FIG. 1 is a block diagram illustrating an exemplary communication system that comprises a home network serviced by a broadband gateway, in accordance with an embodiment of the invention. Referring to FIG. 1, there is shown a home network 100a, a plurality of distribution networks 110, a plurality of service providers 120, and a plurality of content providers 130. The home network 100a may be serviced by a broadband gateway 102. Also shown in FIG. 1 are additional home networks 100b, 100n. Each of the home networks 100b, ..., 100n may also be serviced by a broadband gateway 102.

The service providers 120 may comprise various entities which may provide various services using different access technologies to devices 104 via the gateway 102 and/or to the gateway 102 itself. The services may include, but are not limited to, multimedia, television, Internet, phone, Ethernet, multimedia over coax alliance (MoCA), passive optical network (PON), and/or cellular services, for example. Some of the service providers 120 may comprise network access service providers which provide physical layer connections to the gateway 102. Such physical layer connections may then be utilized to access, and/or may be part of, the distribution networks 110. In this regard, "network access service provider" as utilized herein, is distinguished from the more generic term "service provider" which may encompass services other than providing physical layer access to a network. Cable television providers, plain old telephone service (POTS) providers, digital subscriber line (DSL) providers, cellular providers, WiMAX providers, and satellite providers are examples of network access service providers.

The content providers 130 may generate, capture, and/or package content, such as multimedia content, that may be distributed to end-users. The content may comprise, for example, audio, video, e-book, gaming, and/or other content. The content may be, for example, downloadable and/or streaming, rented and/or purchased. In some instances, a content provider and a service provider may be separate. In some instances, as indicated by the dashed line 106, a single provider may provide both content and services. For example, an entity that functions as a network access service provider may also provide content and/or services other than network access and, thus, that entity may also be accurately referred to as a "content provider" and/or a "service provider." Content and/or services that are provided by a content provider 130 and/or a service provider 120 may be provided to the gateway 110 via a physical layer connection provided by a network access service provider 120.

The plurality of distribution networks 110 may comprise one or more networks that may be operable to enable wireless and/or wired communication among a plurality of entities based on one or more networking and/or communication infrastructures. In this regard, the plurality of distribution networks 110 may be utilized to enable distributing multimedia content generated by the content providers 130, directly and/or via the service providers 120, to end-users. The network connectivity available via the plurality of distribution networks 110 may be based on one or more communication standards and/or protocols. The plurality of distribution networks 110 may comprise, for example, the Internet 110a, a CATV network 110b, a satellite television (TV) network 110c, a wireless local area network/wide area network (LAN/WAN) 110d, and/or a cellular network 110e.

The Internet 110a may comprise a system of interconnected networks to enable exchange of data between a plurality of nodes, based on one or more networking standards, including, for example, the Internet Protocol (IP). For example, the Internet 110a may enable connectivity among a plurality of private and public, academic, business, and/or government nodes and/or networks. The physical connectivity may be provided in the Internet 110a via, for example, the Public Switched Telephone Network (PSTN), copper wires, fiber-optic cables, wireless interfaces, and/or other protocols and/or standards-based interfaces. The transport functionality may be performed in the Internet 110a based on, for example, one or more protocols, such as the Transmission Control Protocol/IP (TCP/IP), for example. The CATV network 110b may comprise suitable distribution nodes, systems, and/or subnetworks that may enable forwarding of communication between CATV providers and a plurality of cable-TV consumers. For example, the CATV network 110b may comprise a network of fiber optics and/or coaxial cables for use in CATV broadcasts. The satellite TV network 110c may comprise suitable distribution nodes, systems, and/or subnetworks that may enable communication of satellite TV broadcast by satellite TV providers to a plurality of consumers. For example, the satellite network 110c may comprise a plurality of orbiting satellite nodes and/or one or more terrestrial centers in a satellite-TV system.

The LAN/WAN network 110d may comprise suitable logic, circuitry, interfaces, and/or code that may be operable to enable implementation of one or more wired and/or wireless LAN or WAN standards and/or protocols. Exemplary WAN technologies comprise, for example, WiMAX-based networks. Exemplary LAN technologies may comprise, for example, those based on IEEE 802.11 standards, including, for example, WiFi-based networks. The cellular network 110e may comprise suitable logic, circuitry, interfaces and/or code that may be operable to enable communication via one or more cellular technologies. Exemplary cellular technologies may comprise Code Division Multiple Access (CDMA), wideband CDMA (WCDMA), CDMA1000, High-Speed Downlink Packet Access (HSDPA), Global System for Mobile Communications (GSM), General Packet Radio Services (GPRS), Enhanced Data Rates for Global Evolution (EDGE), and/or Universal Mobile Telecommunication System (UMTS). The cellular network 110e may comprise, for example, a plurality of control and/or switching nodes, and a plurality of base stations that enable transmission and/or reception of cellular based communications between the cellular network 110e and cellular capable devices.

The home network 100a may correspond to a location that may comprise a plurality of devices 104 which may be serviced and/or managed by the broadband gateway 102. In this regard, the location may be a residence (e.g., home, apartment), a small business, a school, a library, and/or other like settings in which users may want to obtain access to service and/or to content provider networks. The broadband gateway 102 may be utilized in the home network 100a to provide connectivity between the home network 100a and the service providers 120 (and/or the content providers 130) via the distribution networks 110.

The broadband gateway 102 may comprise suitable logic, circuitry, interfaces, and/or code that may be operable to provide connectivity between one or more devices in a home network, such as the home network 100a, and a plurality of external networks. For example, the broadband gateway 102 may handle a plurality of broadband physical layer connections 108 to the distribution networks 110. The broadband physical layer connections 108 may comprise wired, optical, and/or wireless connections between the broadband gateway 102 and the distribution networks 110, which may enable communication between the broadband gateway 102 and the service providers 120. The broadband gateway 102 may operate as an interface device that may allow one or more service and/or content providers to interact with various devices in the home network. In this regard, the broadband gateway 102 may be operable to perform and/or provide various services that may pertain to enabling and/or facilitating reception of content from one or more content providers, wherein the content may be delivered through one or more services providers. For example, the broadband gateway 102 may be operable to perform such operations as network access related processing (e.g., PHY/MAC, transport layer processing), encryption and/or decryption, user and/or account authentication, and/or at least some of video and/or audio processing operations that may be needed for consumption of multimedia content. The broadband gateway 102 may communicate with various devices in the home network 100, using wired and/or wireless communication links.

A single broadband gateway 102 may be operable to handle multiple physical layer (i.e., layer 1 of the open-systems interconnection model (OSI)) connections 108 to multiple ones, or portions, of the distribution networks 110, where different ones or portions of the distribution network(s) 110 are owned, operated, leased, or otherwise associated with different network access service providers 120. For example, a first network access service provider 120 may provide network access to the gateway 102 via a DSL connection over twisted-pair cabling, and a second network access service provider 120 may provide network access to the gateway 102 via a cable television connection over coaxial cabling. In some instances, the gateway 102 may be operable to concurrently communicate over multiple physical layer connections provided by multiple network access service providers.

The broadband gateway 102 may also be operable to provide and/or support various other, non-content related services in the home network 100. For example, the broadband gateway 102 may be operable to provide energy management in the home network 102, by controlling and/or adjusting configuration of one or more devices in the home network to reduce power consumption for example.

Devices serviced by, and/or connected with the broadband gateway 102 may comprise content consuming devices and/or other, non-content consuming household or home devices that may be operable to interact with the broadband gateway 102. For example, the broadband gateway 102 may service, and/or may communicate with a plurality of home devices 104a-104j in the home network 100a. The home devices may comprise, for example, one or more of a television 104a, a laptop computer 104b, a smoke detector, a carbon monoxide detector, and/or a security alarm 104c, a computer and/or server 104d, a mobile phone 104e, a speaker 104f, an AM/FM radio 104g, a phone 104h, an appliance 104i (e.g., refrigerator), and a digital video recorder (DVR) or personal video recorder (PVR) 104j. The broadband gateway 102 may interact with each of the home devices 104a-104j via links 106a-106j, which may be supported by the broadband gateway 102 and the corresponding home device. For example, the link 106a between the broadband gateway 102 and the television 104a may comprise a High-Definition Multimedia Interface (HDMI) cable and/or 60 GHz WiGig wireless connection/interface. The link 106b may comprise, for example, a wired Ethernet link, a wireless Ethernet link, a Universal Serial Bus (USB) link, or an IEEE 1394 link. The link 106c may comprise, for example, a two-wire link or a wireless link. The link 106d may comprise, for example, a wired Ethernet link, a wireless Ethernet link, a USB link, or an IEEE 1394 link. The link 106e may comprise, for example, a wireless Ethernet link, a USB link, or a cellular link. The link 106f may comprise speaker wire and/or a wireless link. The link 106g may comprise, for example, AM and/or FM radio transmissions broadcast received using the broadband gateway 102. The link 106h may comprise, for example, a phone line. The link 106i may comprise, for example, a wired or wireless Ethernet link. The link 106j may comprise, for example, a wired or a wireless link.

In the exemplary embodiment of the invention illustrated in FIG. 1, although the devices 104a-104j, may communicate only the broadband gateway 102 as shown, the invention may not be so limited. Accordingly, the devices 104a-104j, may communicate with multiple broadband gateways in a local or home network without departing from the spirit and scope of various embodiments of the invention.

As illustrated in FIG. 1, a plurality of home networks 100b, 100n, may also be connected to the distribution networks 110. These home networks 100b, 100n may operate in substantially the same manner as the home network 100a. By having multiple home networks connected to the distribution networks 110, various applications, such as peer-to-peer communication and/or data aggregation operations may be possible by utilizing the broadband gateways 102 in the home networks.

In operation, the devices 104 such as the device 104a associated with the broadband gateway 102 may request that content be delivered to it via the broadband gateway 102. The broadband gateway 102 may communicate with the content providers 130 and/or the service providers 120 for the content requested by the device 104a.

In an embodiment of the invention, the broadband gateway 102, before allowing the device 104a to access the content, may select a content delivery mechanism based on an associated network power profile and device power profile. The selected content delivery mechanism may enable optimizing or reducing power consumption in the home network 100a. U.S. patent application Ser. No. 12/981,966 filed on Dec. 30, 2010, U.S. patent application Ser. No. 12/982,172 filed on Dec. 30, 2010, U.S. patent application Ser. No. 12/982,236 filed on Dec. 30, 2010, and U.S. patent application Ser. No. 12/982,477 filed on Dec. 30, 2010, provide detailed descriptions that a broadband gateway 102 may incorporate user incentives to support content access, and are hereby incorporated herein by reference in their entireties. In this regard, the broadband gateway 102 may be operable to provide incentives such as 5% discount for the device 104a to accept the selected content delivery mechanism in order to save power. The content delivery mechanism selected for the device 104a may specify or comprise information such as, for example, content bit rate, content encoding format and/or physical layer connection to deliver the content to the device 104a via the broadband gateway 102. A network power profile corresponding to the content received from the content providers 130 and/or the service providers 120 may comprise information such as, for example, content type, content bit rate, content encoding format, and/or associated physical layer connections. A device power profile for the device 104a may comprise device type, physical layer connections supported and content processing capabilities such as content detection, content filters, content coding, and/or content transcoding. The broadband gateway 102 may determine or identify a power profile for the device 104a in various ways. For example, the broadband gateway 102 may select, extract and/or calculate power consumption features or levels associated with the device 104a, and/or related channels and content/streams. The power features for a stream may comprise various stream characteristics such as content type, bit rate and/or encoding format.

In an embodiment of the invention, the broadband gateway 102, before delivering the content received from the content providers 130 and/or the service providers 120 to the device 104a, for example, may transcode or convert the received content according to a content delivery mechanism selected for the device 104a. The transcoded content may be delivered to the device 104a for content consumption.

In an embodiment of the invention, the broadband gateway 102 may forward or communicate the content received from the content providers 130 and/or the service providers 120 to the device 104a, for example. In this regard, no content transcoding or content conversion is performed by the broadband gateway 102 to save power. The broadband gateway 102 may match up the received content with the device 104a which may decode the content thereafter for content consumption.

In an embodiment of the invention, in instances where the broadband gateway 102 may have access to a local storage module such as a hard drive, the broadband gateway 102 may burst download the content from the content providers 130 and/or the service providers 120. Burst downloading is a way to quickly download the content with long data bursts from the content providers 130 and/or the service providers 120. A long data burst is referred to as a higher rate transmission to reduce the transmission time for a given channel capacity. The broadband gateway 102 may push or store the content very quickly to the hard drive. The content stored in the hard drive may be delivered to a device such as the device 104a whenever needed. Upon completion of download, one or more receiving components such as tuner device utilized by the broadband gateway 102 to receive content from the content providers 130 and/or the service providers 120 may be shut down in order to save resources and power in the home network 100a. The one or more receiving components may be turned on or resumed to receive additional content from the content providers 130 and/or the service providers 120 when needed.

Figure 2:
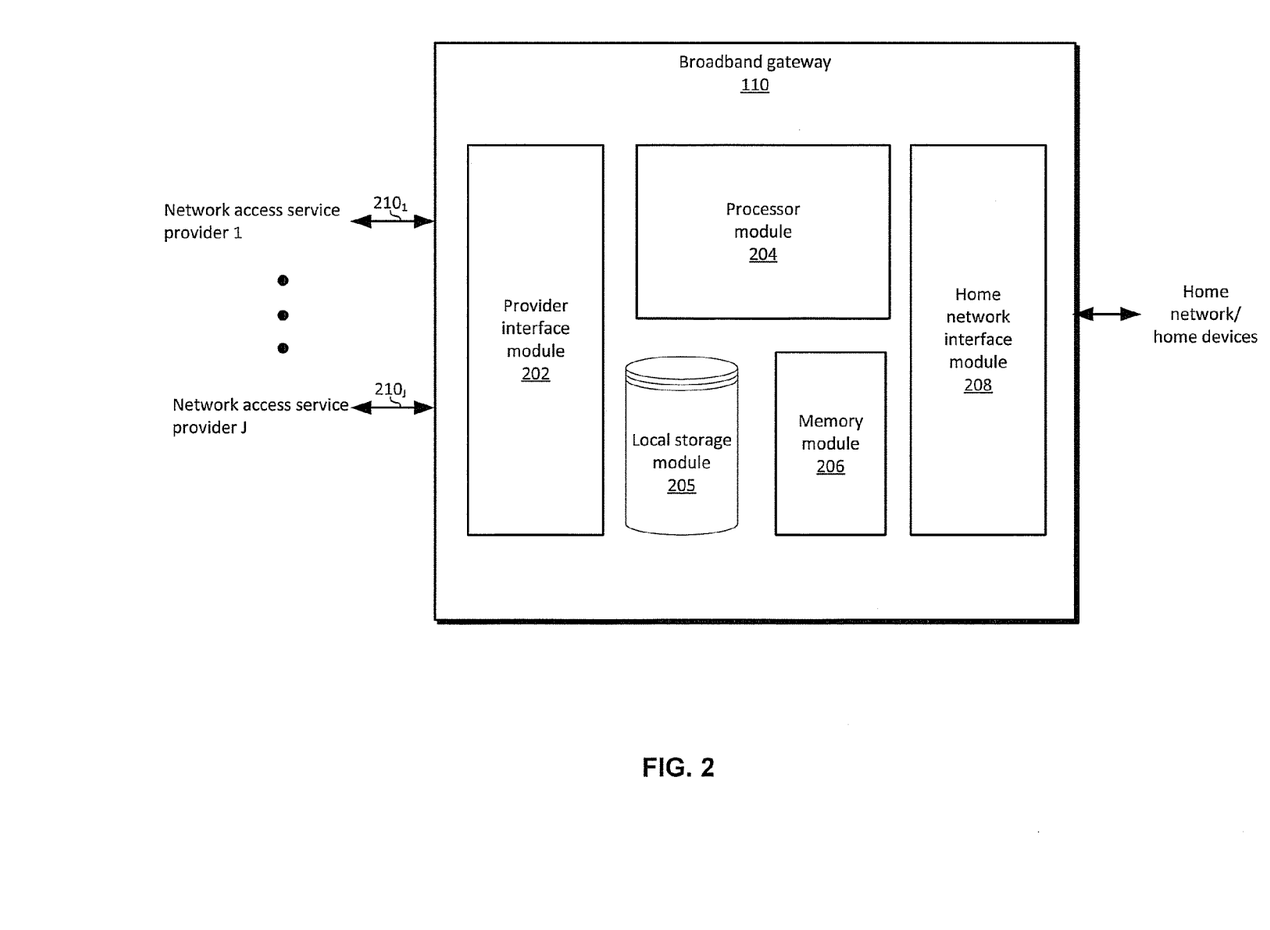
FIG. 2 is a diagram illustrating an exemplary broadband gateway, which may be operable to optimize power consumption in a home network, in accordance with an embodiment of the invention.

FIG. 2 is a block diagram illustrating an exemplary broadband gateway, in accordance with an embodiment of the invention. Referring to FIG. 2, the broadband gateway 102 may comprise suitable logic, circuitry, code, and/or interfaces that may be operable to provide connectivity between one or more networks, such as the distribution networks 110 shown in FIG. 1, for example, and one or more devices in a home network, such as the home devices 104a-104j in the home network 100a shown in FIG. 1. In this regard, the broadband gateway 102 may operate as an interface device that allows one or more devices in the home network to access one or more networks, and to access various services and/or content via those one or more networks. For example, the broadband gateway 102 may be utilized to enable interaction between the plurality of service providers 120 and/or the plurality of content providers 130, and the home devices 104a-104j.

The broadband gateway 102 may communicate with the various devices via a home network that may comprise wired and/or wireless communication links, such as the home network 100a. In this regard, the broadband gateway 102 may comprise suitable hardware and/or software to provide some or all of the functions and/or operations of one or more of a modem, a router, and a switch. The modem functions and/or operations may be those of a digital subscribed line (DSL) modem, a cable modem, or a wireless cable modem, for example. The router functions and/or operations may be those of a wireless router, for example. The switch functions and/or operations may be those of a network switch, or a local area network (LAN) switch, for example. In some instances, the broadband gateway 102 may communicate with the various devices in the home via more than one home network.

The broadband gateway 102 may comprise one or more modules. Each of these modules may comprise hardware, software, or a combination thereof that may be utilized to perform various operations associated with the broadband gateway 102. In an embodiment of the invention, the broadband gateway 102 may comprise a provider interface module 202, a processor module 204, a local storage module 205, a memory module 206, and a home network interface module 208. In some instances, the broadband gateway 102 may be such that the various modules listed above may be distributed over multiple devices. Moreover, the modules listed above are provided by way of illustration and not of limitation. Other configurations and/or architectures of the broadband gateway 102 may also be implemented. For example, the broadband gateway 102 may be a virtual gateway that is setup in a network by utilizing virtual machines (VMs) and/or next-generation (NG) data centers.

The provider interface module 202 may comprise suitable logic, circuitry, code, and/or interfaces that may be operable to receive data from and/or send data to one or more service/content providers via one or more physical layer connections 130 to one or more network access service providers. In this regard, each of the physical layer connections $130_1$-$130_j$ may connect the gateway 110 to a difference network access service provider. Each of the physical layer connections 130 may comprise a wired, optical, or wireless connection. Each of the physical layer connections 130 may utilize different physical media and/or different physical layer protocols. For example, the connection $130_1$ may comprise a DSL over twisted-pair connection and the connection $130_j$ may comprise a CATV over coaxial cable connection.

The processor module 204 may comprise suitable logic, circuitry, code, and/or interfaces that may be operable to process data received from the service/content providers and/or data received from one or more devices 104 in the home. Data received from the service/content providers via one or more the physical layer connections $210_1$-$210_j$ may be processed to make it suitable for communication to a device such as the device 104a and data from the one or more devices 104 may be processed to make it suitable for communication to the service/content providers via one or more the physical layer connections $210_1$-$210_j$. In this regard, the processor module 204 may comprise one or more portions that are suitable to handle certain types of data such as video data and/or audio data, for example. The processor module 204 may also be operable to generate a graphical user interface (GUI) which may be manipulated via which a user may provide input. The GUI may be displayed as part of an OSD on a local device 104, such as a monitor or television, and may be manipulated via a remote control and/or other input device that communicates directly with the broadband gateway 102. The GUI may be a web-based interface, and a user may interact with it via a computer and web browser. The GUI may be customized based on characteristics of the broadband gateway 102, the device 104 coupled to the broadband gateway 102, and the service and/or content providers associated with the broadband gateway 102. The processors module 204 may utilize the local storage module 205 and/or the memory 206 in performing its functions.

The local storage module 205 may comprise suitable logic, circuitry, interfaces and/or code that may be operable to record and store preferred content downloaded from the content providers 130 and/or the service providers 120. The local storage module 205 may be utilized to store information such as network power profiles and device power profiles associated with the preferred content. The local storage module 205 is an optional component for the broadband gateway 102. The local storage module 205 may comprise a solid state drive and/or a magneto- and/or optical drives such as a hard disk. The local storage 418 may also comprise solid state memory such as flash memory and/or other suitable electronic data storage capable of recording and storing data and instructions.

The memory module 206 may comprise suitable logic, circuitry, code, and/or interfaces that may be operable to store data utilized in the operations of the broadband gateway 102. For example, the memory module 206 may be utilized to store configuration data, parameters, device information, tracking and/or monitoring information, security information, and intermediate processing data, for example. The memory module 206 may comprise storage media that may be integrated in the broadband gateway 102 and/or may be removable such as a removable storage device.

The home network interface module 208 may comprise suitable logic, circuitry, code, and/or interfaces that may be operable to receive data from and/or send data to one or more devices in the home network. The home network interface module 208 may be operable to support multiple communication protocols, standards, and/or data transport technologies. In this regard, the home network interface module 208 may handle one or more physical layer connections to one or more devices 104. For example, the home network interface module 208 may comprise, one or more wired and/or wireless Ethernet interfaces, one or more analog and/or digital audio outputs, one or more audio/video interfaces such as such as HDMI and DisplayPort, 60 GHz WiGig wireless connection/interface, one or more USB interfaces, one or more IEEE 1394, and/or one or more telephone jacks.

The broadband gateway 102 may be operable to provide energy management by varying the configuration of one or more devices in the home network. The broadband gateway 102 may collect and/or store energy-related information of the devices in the home network and/or of the links in the home network, and may utilize such information to control the operation of the home devices. For example, the broadband gateway 102 may utilize channel capacity flexibility and content coding options to minimize and/or optimize power utilization. The broadband gateway 102 may also configure and/or manage the configuration of the network between the broadband gateway 102 and one or more service/content providers based on the energy-related information associated with the devices in the home. For example, at least a portion of the distribution networks 100 may be configured and/or managed in this manner. The broadband gateway 102 may be utilized to display energy-related metrics, including consumption trends and/or costs, for example, and to display any available credits/rewards that may be redeemed by a user. In some instances, when a device in the home network is a certified device, such as a California efficient display, for example, the broadband gateway 102 may be utilized to provide that information to a service/content provider and obtain rewards/credits associated with the use of such certified devices. Moreover, overall network power consumption may be managed by sharing information among multiple interconnected broadband gateways.

The broadband gateway 102 may be operable to adapt and/or enable changes in a subscription model and/or in multimedia delivery characteristics based on the capabilities of the various devices in the home network. For example, high-definition video content may be delivered to certain type of devices, such as digital televisions (DTVs), while low-definition video content and/or text may be delivered to a different type of devices, such as personal mobile devices. In this regard, the broadband gateway 102 may be utilized to reduce bandwidth and/or processing power consumption in the home network. The broadband gateway 200 may also support and/or use multi-transport processing, which may be performed sequentially, in parallel, and/or utilizing distributed processing.

The gateway functionality associated with a user, such as security features, preferences, applications, electronic programming guides (EPGs), and user profile, for example, may be ported from the broadband gateway 102 to one or more other broadband gateways 102 in other locations. In some instances, a visitor may be allowed access to their content outside their service/content provider service area by, for example, classifying the access level for different users and/or by providing limited access to content. Moreover, the broadband gateway 102 may allow multiple user interface software structures by, for example, standardizing an interface to service/content providers and devices in the home network.

The broadband gateway 102 may be operable to broker and/or arbitrate with service/content providers the consumption of certain services, such as music and video, for example. In some instances, the broadband gateway 102 may perform content search, transport discovery, ranking, and/or sorting. These operations may be performed based on content quality, price, quality-of-service (QOS), and network protocols supported by the devices in the home network, such as service level agreements (SLAs), for example.

Various emergency-related services in the home network may be supported by the broadband gateway 102, including allowing first responders to provide alerts to a select group of users by accessing the broadband gateway 102 via secure links provided by the service/content providers. For example, the broadband gateway 102 may enable an emergency service provider, such as those associated with the emergency service provider network 140 described above in FIG. 1, to access one or more devices in the home network.

Customized graphical user interfaces (GUIs) may be generated by the broadband gateway 102, wherein the GUIs may be used to visually display and/or provide interaction with the customized content.

For peer-to-peer communication, the broadband gateway 102 may be utilized to allow enhanced content sharing in a service/content provider network. In this regard, the broadband gateway 102 may be utilized to construct a directory service for peer-to-peer connectivity with friends and family, for example. The broadband gateway 102 may be utilized to provide incentives to users who engage in peer-to-peer communication through, for example, the distribution networks 110. Moreover, the broadband gateway 102 may be utilized to match the content coding to the service type being consumed by the user and to make the necessary allocations through the network with respect to peer-to-peer or conventional Internet programming or broadcast programming.

The broadband gateway 102 may be utilized in connection with constrained network resources, such as time of day, traffic congestion, and the like, for example, to provide incentives for a user to accept a lower cost, lower quality of service that is dynamically configured for current network conditions. In some instances, the broadband gateway 102 may allow enhanced low latency service delivery to client devices in a home network.

The broadband gateway 102 may be operable to run or execute an agent to extract content, rating, copyright, language, privacy rules, and automatically add user generated content, for example. Such agent may be run or executed in connection with the processor module 204 of the broadband gateway 102, for example. In some instances, the broadband gateway 102 may be operable to provide rating-related information or channel prediction to a service/content provider to assist with fast channel change.

Bandwidth optimization by, for example, placing future requests for bandwidth to a service/content provider and accepting the best timeslots provided in return may be enabled by the broadband gateway 102.

The broadband gateway 102 may be operable to combine and/or blend multiple contents for use as single content in the home network. Such combination may be performed in one or more of the modules of the broadband gateway 102. For example, the broadband gateway 102 may blend different video and audio contents for an event by accessing one or more service/content providers and providing automatic and/or manual content synchronization.

The protection, management, and/or tracking of confidential data, such as health and financial records, for example, by tagging the data may be provided by the broadband gateway 102. Only when a user authorizes the transfer of the confidential data will such data be stored and/or aggregated. The broadband gateway 102 may be operable to create a trusted rating mechanism for content. The broadband gateway 102 may be secure against external threats that may be downloaded from outside the home network and may provide a secure domain distribution in the home network. Automated and secured billing and payment services may also be provided by the broadband gateway 102.

The broadband gateway 102 may be operable to utilize client or home device profile information to select layered video service(s) and/or transmission. Such information may be stored, at least temporarily, in the memory module 206 of the broadband gateway 102. In some instances, the programming and/or enhanced video layers received by the broadband gateway 102 may be aggregated midstream by one or more network or routing nodes.

The broadband gateway 102 may support a reduction in the cost of unwatched content by using multi-tier billing for downloaded content, such as video content. The broadband gateway 102 may be utilized to provide a unified payment portal for collecting and/or aggregating charges from multiple service and/or content providers.

In operation, a request for content may be received from a device 104 via the home network interface module 208 and the processor module 204 may determine whether to grant the request. In instances that the request is granted, the processor module 204 may then select a content delivery mechanism for the requesting device 104 based on associated network power profile and device power profile. The content delivery mechanism may be selected for the requesting device 104 to optimize or reduce power consumption in the home network 100a. The processor module 204 may provide incentives such as 5% discount to the requesting device 104 to promote the selected content delivery mechanism in order to save power. The processor module 204 may enable outputting the content to the requesting device 104 via the home network interface module 208. In some instances where the content may be stored in the local storage module 205 and/or the memory module 206, the processor module 204 may read the content from the local storage module 205 and/or the memory module 206, perform any necessary or optional processing of the content, and output the content via the home network interface module 208. In some instances, the content may be stored in a device 104, such as a DVR, and the processor 204 may request the content from the DVR via the home network interface module 208, perform any necessary or optional processing of the content, and deliver the content to the requesting device 104 via the home network interface module 208. In some instances, the processor module 204 may send, via the provider interface module 202, a request to a content provider 130 that provides the content, the content may be received via the provider interface module 202, processed by the process module 204, and sent to the requesting device 104 via the home network interface module 208.

In an embodiment of the invention, the process module 204 may first transcode or convert the received content and then deliver the transcoded content via the home network interface module 208 to the requesting device 104 according to a content delivery mechanism selected for the requesting device 104. The process module 204 may provide or deliver the transcoded content to the requesting device 104 for content consumption.

In an embodiment of the invention, the process module 204 may directly forward or pass the received content to the requesting device 104 via the home network interface module 208 without performing content transcoding in order to save power. In this regard, the process module 204 may match up the received content with the requesting device 104 which may be operable to decode the received content thereafter for content consumption.

In an embodiment of the invention, in instances where the process module 204 may have access to the local storage module 205, the process module 204 may be operable to download the content, via the provider interface module 202, with long data bursts, and may push or store the content very quickly to the local storage module 205. The stored content in the local storage module 205 may be delivered via the home network interface module 208 to the requesting device 104 whenever needed. The process module 204, after the content downloading is complete, may turn off one or more receiving components such as tuner device utilized for receiving content via the provider interface module 202 to save resources and power. The one or more receiving components may be turned on to receive additional content from the content providers 130 and/or the service providers 120 when needed.

Figure 3:
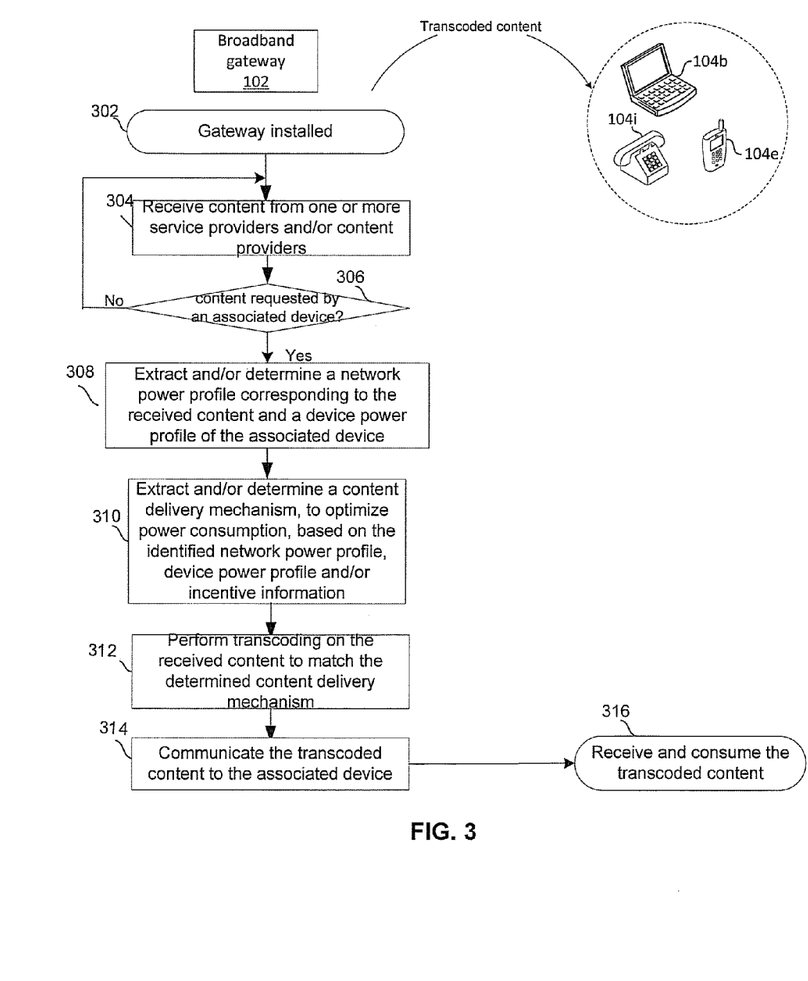
FIG. 3 is a flow chart illustrating exemplary steps that may be performed by a broadband gateway to optimize power consumption in a home network through content transcoding, in accordance with an embodiment of the invention.

FIG. 3 is a flow chart illustrating exemplary steps that may be performed by a broadband gateway to optimize power consumption in a home network through content transcoding, in accordance with an embodiment of the invention. Referring to FIG. 3 the exemplary steps may begin in step 302 in which a broadband gateway 102 may interface with a device 104 and the service/content providers via the distribution network(s) 110. In step 304, the broadband gateway 102 may receive or download content from the content providers 130 and/or the service providers 120. The received content may be stored or buffered in the local storage module 205 and/or the memory module 206. In step 306, it may be determined whether the received content is requested by the device 104. In instances where the received content is requested by the device 104, then in step 308, the broadband gateway 102 may select, extract or determine a network power profile corresponding to the received content and a device power profile of the device 104.

In step 310, the broadband gateway 102 may select, extract or determine a content delivery mechanism for the device 104 based on the determined network power profile, device power profile and/or possible incentive information such as 5% discount to the end user. The content delivery mechanism may be selected or determined to optimize or reduce power consumption in the home network 100a. In step 312, the broadband gateway 102 may perform transcoding on the received content to match up the determined content delivery mechanism. In step 314, the broadband gateway 102 may communicate the transcoded content to the device 104 utilizing the determined content delivery mechanism. In step 316, the device 104 may receive and consume the transcoded content, accordingly.

In step 306, in instances where the received content is not requested by the device 104, then the exemplary steps may return to step 304.

Figure 4:
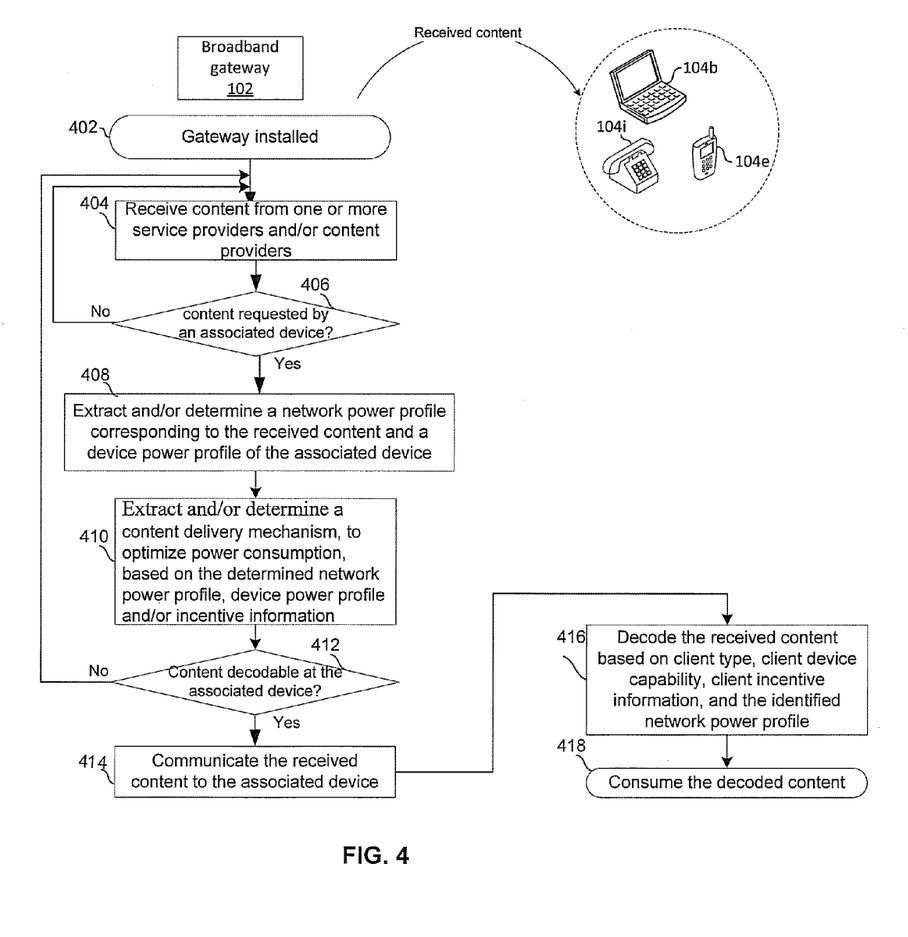
FIG. 4 is a flow chart illustrating exemplary steps that may be performed by a broadband gateway to optimize power consumption in a home network without content transcoding, in accordance with an embodiment of the invention.

FIG. 4 is a flow chart illustrating exemplary steps that may be performed by a broadband gateway to optimize power consumption in a home network without content transcoding, in accordance with an embodiment of the invention. Referring to FIG. 4, the exemplary steps may be begin with step 402 in which a broadband gateway 102 may be installed to interface with a device 104 and the service/content providers via the distribution network(s) 110. In step 404, the broadband gateway 102 may receive or download content from the content providers 130 and/or the service providers 120. The received content may be stored or buffered in the local storage module 205 and/or the memory module 206. In step 406, it may be determined whether the received content is requested by the device 104. In instances where the received content is requested by the device 104, then in step 408, the broadband gateway 102 may select, extract or determine a network power profile corresponding to the received content and a device power profile of the device 104.

In step 410, the broadband gateway 102 may select, extract or determine a content delivery mechanism for the device 104 based on the identified network power profile, device power profile and/or incentive information. The content delivery mechanism may be determined to optimize power consumption in the home network 100a. In step 412, it may be determined whether the received content is decodable at the device 104. In instances where the received content is decodable at the device 104, then in step 414, the broadband gateway 102 may communicate the received content to the device 104 according to the determined content delivery mechanism for the device 104. In step 416, the device 104 may receive and decode the received content according to the selected content delivery mechanism. In step 428, the device 104 may consume the decoded content, accordingly.

In step 406, in instances where the received content is not requested by the device 104, then the exemplary steps may return to step 404.

In step 412, in instances where the received content is decodable at the device 104, then the exemplary steps may return to step 404.

Figure 5:
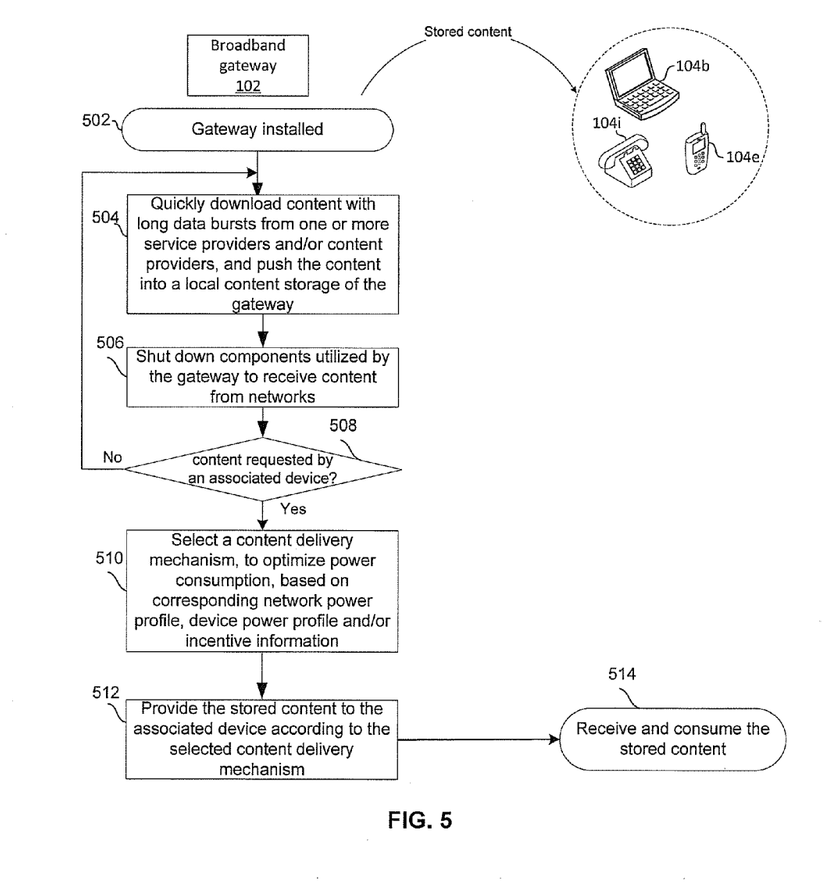
FIG. 5 is a flow chart illustrating exemplary steps that may be performed by a broadband gateway to optimize power consumption in a home network through bursting and sleeping operation, in accordance with an embodiment of the invention.

FIG. 5 is a flow chart illustrating exemplary steps that may be performed by a broadband gateway to optimize power consumption in a home network through bursting and sleeping operation, in accordance with an embodiment of the invention. Referring to FIG. 5, the exemplary steps may begin with step 502, in which a broadband gateway 102 may be installed to interface with the devices 104 and the service/content providers via the distribution network(s) 110. In step 504, the broadband gateway 102 may quickly download content with long data bursts from the content providers 130 and/or the service providers 120, and push the content into the local content storage 205 of the broadband gateway 105. In step 506, the broadband gateway 102 may shut down one or more receiving components such as tuner device utilized to receive content from networks. The one or more receiving components may be turned on or resumed to receive additional content from the content providers 130 and/or the service providers 120 when needed. In step 508, it may be determined if the stored content is requested by a device 104. In instances where the stored content is requested by the device 104, then in step 510, the broadband gateway 102 may select a content delivery mechanism for the device 104 based on corresponding network power profile, device power profile and/or incentive information. In step 512, the broadband gateway 102 may provide the stored content to the device 104 according to the selected content delivery mechanism. In step 514, the device 104 may receive and consume the stored content, accordingly.

Various aspects of a method and system for optimizing power consumption in a home network via a broadband gateway are provided. In an exemplary embodiment of the invention, a broadband gateway 102 enables communication with a plurality of devices 104. The broadband gateway 102 is operable to handle at least one physical layer connection to at least one corresponding network access service provider. The broadband gateway 102 may be operable to identify a device power profile for each of one or more of the devices 104, and a network power profile associated with content provided by the at least one network access service provider. The at least one physical layer connection may comprise a plurality of physical layer connections such as the physical layer connections $210_1$-$210_J$ and the at least one corresponding network access service provider may comprise a plurality of corresponding access service providers such as the service providers 120 and/or the content providers 130. Each of the plurality of physical layer connections $210_1$-$210_J$ corresponds to a respective one of the plurality of corresponding access service providers. The broadband gateway 102, before allowing the one or more of the devices 104 to access the content, may select a content delivery mechanism for each of the one or more of the devices 104 based on the identified network power profile and the corresponding identified device power profile. The broadband gateway 102 may communicate the content to the one or more of the devices 104 according to the corresponding selected content delivery mechanism. A device power profile may comprise device type, physical connection support and content processing capabilities such as content detection, content filters, content coding, and/or content transcoding. A network power profile for the content received from the at least one network access service provider may comprise information such as, for example, content type, content bit rate, content encoding format, and/or corresponding physical connections.

Content delivery mechanisms may be selected by optimizing or reducing power consumption in the home network 100a. Depending on system configuration, the broadband gateway 102, before delivering the content received from the at least one network access service provider to the one or more of the devices 104, may transcode or convert the received content according to the corresponding selected content delivery mechanisms. Alternatively, the broadband gateway 102 may provide or match up the received content with the one or more of the devices 104 which may decode the content thereafter for content consumption.

In instances where the broadband gateway 102 is coupled to the local storage module 205, the broadband gateway 102 may burst download the content from the at least one network access service provider, and store the downloaded content in the local storage module 205. Upon the completion of download, one or more receiving components such as tuner device utilized by the broadband gateway 102 to receive the content from the at least one network access service provider may be shut down to save resources and power in the home network 100a. The one or more receiving components may be turned on to receive additional content from the at least one network access service provider when needed.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for optimizing power consumption in a home network via a broadband gateway.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
   in a broadband gateway that enables communication with a plurality of devices, wherein said broadband gateway is operable to handle at least one physical layer connection to at least one network access service provider:

identifying a device power profile for one or more of said plurality of devices and a network power profile associated with content provided by said at least one network access service provider;

selecting a content delivery mechanism for delivery of said content from said broadband gateway to said one or more of said plurality of devices based on power savings incentive information and said identifying; and communicating said content to said one or more of said plurality of devices based on said content delivery mechanism.

2. The method according to claim 1, wherein identifying said device power profile comprises calculating a power consumption level associated with a feature of said one or more of said plurality of devices.

3. The method according to claim 1, wherein:
said device power profile comprises at least one of device type, physical connection, or content processing capabilities; and
said network power profile comprises at least one of content type, content bit rate, content encoding format, or physical connection.

4. The method according to claim 1, comprising selecting said content delivery mechanism for each of said one or more of said plurality of devices to optimize power consumption.

5. The method according to claim 1, comprising:
transcoding said content for said one or more of said plurality of devices into transcoded content based on said content delivery mechanism; and
communicating said transcoded content to said one or more of said plurality of devices.

6. The method according to claim 1, comprising burst downloading said content from said at least one network access service provider.

7. The method according to claim 6, comprising storing said content in a local storage that is coupled to said broadband gateway.

8. The method according to claim 6, comprising shutting down, subsequent to said burst downloading, one or more receiving components that are utilized by said broadband gateway to receive said content from said at least one network access service provider.

9. A system for networking, the system comprising:
one or more circuits for use in a broadband gateway that enables communication with a plurality of devices and at least one network access service provider via at least one physical layer connection, said one or more circuits being operable to:
identify a device power profile for one or more of said plurality of devices and a network power profile associated with content provided by said at least one network access service provider;
select a content delivery mechanism for delivery of said content from said broadband gateway to said one or more of said plurality of devices based on power savings incentive information and at least one of said device power profile or said network power profile; and
communicate said content to said one or more of said plurality of devices based on said content delivery mechanism.

10. The system according to claim 9, wherein said one or more circuits are operable to calculate a power consumption level associated with a feature of said one or more of said plurality of devices.

11. The system according to claim 9, wherein:
said device power profile comprises at least one of device type, physical connection, or content processing capabilities; and
said network power profile comprises at least one of content type, content bit rate, content encoding format, or physical connection.

12. The system according to claim 9, wherein said one or more circuits are operable to select said content delivery mechanism for each of said one or more of said plurality of devices to optimize power consumption.

13. The system according to claim 9, wherein said one or more circuits are operable to:
transcode said content for said one or more of said plurality of devices into transcoded content based on said content delivery mechanism; and
communicate said transcoded content to said one or more of said plurality of devices.

14. The system according to claim 9, wherein said one or more circuits are operable to burst download said content from said at least one network access service provider.

15. The system according to claim 14, wherein said one or more circuits are operable to store said content in a local storage that is coupled to said broadband gateway.

16. The system according to claim 14, wherein said one or more circuits are operable to shut down, subsequent to said burst download, one or more receiving components that are utilized by said broadband gateway to receive said content from said at least one network access service provider.

17. A method for networking, comprising:
identifying a network power profile associated with content provided from at least one network access service provider and requested by a device in a network;
identifying a device profile of said device in said network;
selecting, by a processing circuit of a broadband gateway, a content delivery mechanism for delivering said content from said broadband gateway to said device based on power savings incentive information and at least one of said network power profile and said device profile; and
communicating said content to said device according to said content delivery mechanism.

18. The method of claim 17, further comprising displaying, by said broadband gateway, energy related consumption trends or costs associated with said device in said network.

19. The method of claim 17, further comprising:
identifying a certified efficiency device on said network; and
obtaining a credit for use of the certified efficiency device.

20. The method of claim 17, further comprising transcoding said content based on said content delivery mechanism.

* * * * *